United States Patent [19]

Kirkland, Jr.

[11] 4,359,996

[45] Nov. 23, 1982

[54] SYSTEM FOR PREPARING HOT VAPORIZED FUEL FOR USE IN INTERNAL COMBUSTION ENGINE

[75] Inventor: James C. Kirkland, Jr., 7102 Pearl St., Jacksonville, Fla. 32208

[73] Assignee: James C. Kirkland, Jr., Jacksonville, Fla.

[21] Appl. No.: 125,194

[22] Filed: Feb. 27, 1980

[51] Int. Cl.³ .......................................... F02M 31/00
[52] U.S. Cl. ................................... 123/557; 123/553; 123/578
[58] Field of Search ............... 123/575, 578, 525, 557, 123/553; 261/145, 144

[56] References Cited

U.S. PATENT DOCUMENTS

| | | | |
|---|---|---|---|
| 1,323,264 | 12/1919 | Gerli | 123/553 |
| 2,748,758 | 6/1956 | Fairbanks | 123/557 |
| 3,447,511 | 6/1969 | Beard | 123/557 |
| 3,987,777 | 10/1976 | Harrow | 123/553 |

Primary Examiner—Ronald H. Lazarus
Attorney, Agent, or Firm—Arthur G. Yeager

[57] ABSTRACT

A system for vaporizing fuel and mixing it in controlled proportions with liquid fuel as a feed to a carburetor in an internal combustion engine comprising a vapor generator for heating liquid fuel to vaporize it, a jacket around the generator filled with a liquid heating medium, a means for controlling the heating of the liquid heating medium by exchange with the exhaust of the engine, a first temperature sensing means to detect when the vaporized fuel in the vapor generator reaches a predetermined value and signaling a controlled means to admit vaporized fuel to the feed line to the carburetor and correspondingly to reduce liquid fuel being fed to the carburetor, a second temperature sensing means in said jacket for controlling the amount of heat absorbed by the liquid heating medium from the exhaust, a first pressure regulator means in the vapor outlet of the vapor generator to direct vaporized fuel to the feed of the carburetor upon reaching a predetermined pressure in the vapor generator, and a second pressure regulator means in the vapor outlet of the vapor generator to direct vaporized fuel to a condenser for liquefaction and return to the fuel storage tank when the pressure reaches a predetermined value in excess of that value set for the first pressure regulator means.

13 Claims, 4 Drawing Figures

U.S. Patent      Nov. 23, 1982      4,359,996
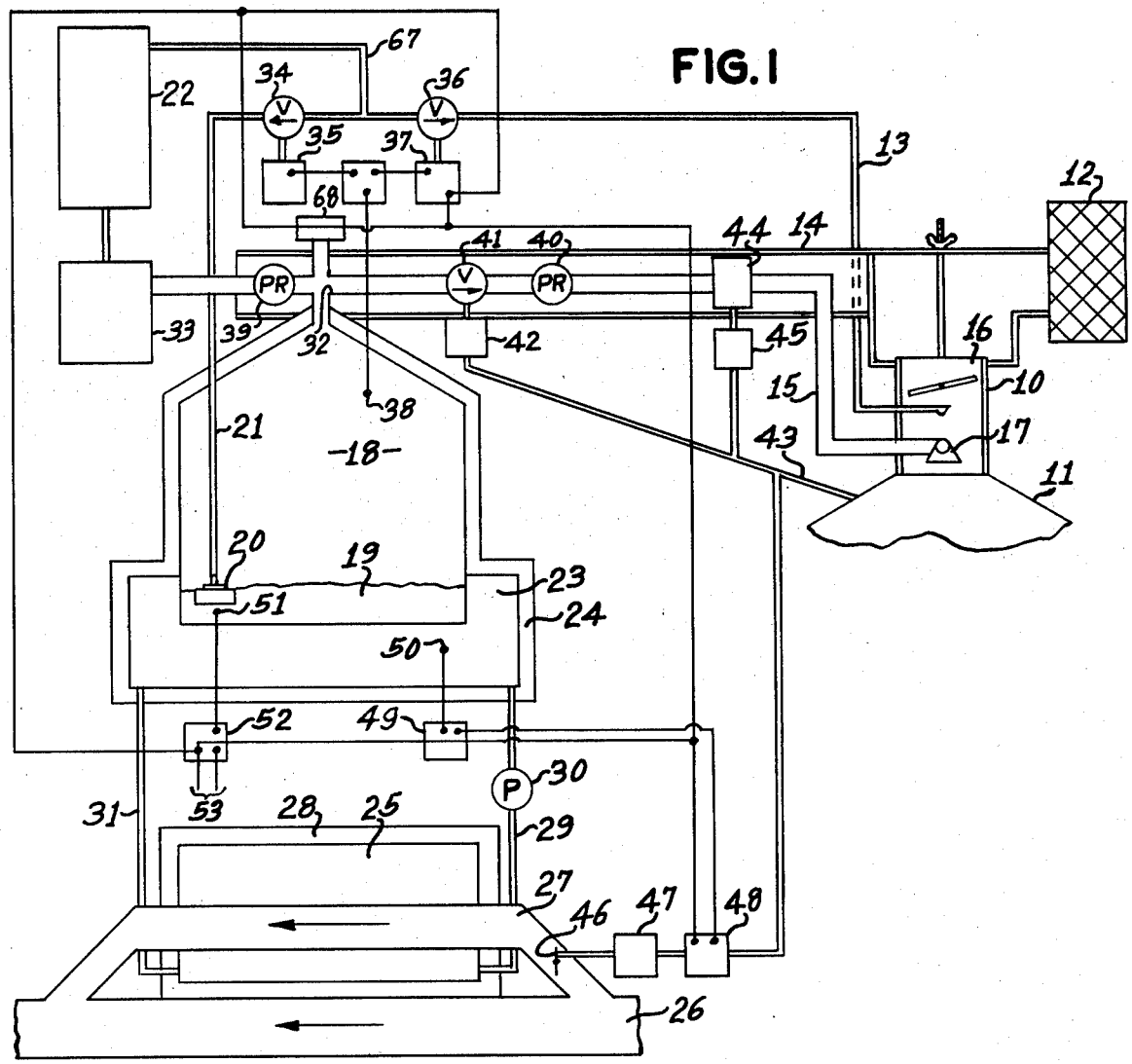
FIG.1
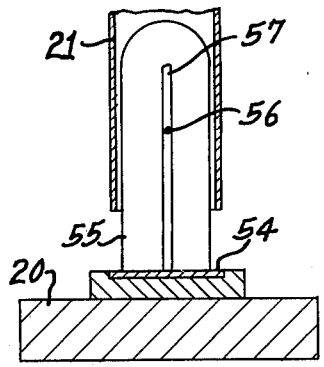
FIG.2
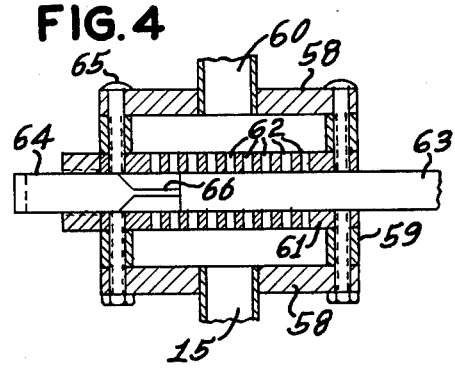
FIG.3
FIG.4

SYSTEM FOR PREPARING HOT VAPORIZED FUEL FOR USE IN INTERNAL COMBUSTION ENGINE

BACKGROUNG OF THE INVENTION

This invention relates to a means for improving the efficiency of an internal combustion engine, particularly an automobile engine whereby the mileage achieved upon using a given amount of fuel is greatly increased. accordingly, unburned, or incompletely burned, fuel is exhausted to the atmosphere. Two undesirable results occur; namely, the fuel is not burned as completely as it should and accordingly potentially available energy is lost, and the exhaust of unburned fuel to the atmosphere is a pollution problem which in more recent times has become so serious as to be the target of governmental regulations requiring its substantial reduction or elimination. Much research has been directed in the past at the vaporization of liquid fuel in the carburetor to provide the apropriated mixture of fuel and oxygen and, more importantly, to produce the smallest possible subdivision of the liquid fuel in the oxygen. It has long been recognized that the smaller the drops of fuel in the feed to the engine, the more complete will be the combustion. Some attempts have been made to vaporize the fuel separately from the carburetor and feed it as a vapor to the carburetor for mixing with air. Among the methods used for vaporization have been heat, although it is readily recognized that this is a delicate and somewhat dnagerous method since the heated vaporized fuel is so readily flammalble as to be explosive. Nevertheles, this procedure is recognized as being one which will produce an extremely good dispersion of the fuel in minute particles. Theoretically if the fuel could be vaporized to molecular size the ultimate would be achieved. It is believed that the present invention approaches this ultimate objective as closely as possible and provides suitable controls whereby the vaporized fuel can be employed most effectively.

It is an object of this invention to provide a new and improved method for vaporizing fuel in an internal combustion engine and feeding it to the carburetor of the engine. It is another object of this invention to provide controlled means for heating fuel in an automobile engine and to provide hot vaporized fuel to serve as feed to the carburetor. It is still another object of this invention to provide automatic control means for accomplishing these purposes. Further objects will appear to those skilled in this art from the more detailed description of the invention which follows.

BRIEF SUMMARY OF THE INVENTION

This invention provides a system for vaporizing fuel and controlling the proportioning of it with liquid fuel as feed to a carburetor in an internal combustion engine comprising a vapor generator having a vapor space above a liquid fuel space; a jacket around said liquid fuel space filled with a liquid heating medium; means for controlled heating of said liquid heating medium by heat exchange with the exhaust of said internal combustion engine; first temperature sensing means in said vapor space connected to means for introducing liquid fuel into the vapor generator when the temperature reaches a preset value and also connected to means for corresponding reducing the amount of liquid fuel admitted to the carburetor of said engine; first pressure regulator means in the vapor outlet of said vapor generator to direct vaporized fuel to said carburetor upon reaching a preset pressure; second pressure regulator means in the vapor outlet of said vapor generator to direct vaporized fuel upon reaching a preset pressure to a condenser for liquefying said vaporized fuel and conducting it to the fuel storage tank of said engine; and second temperature sensing means in said jacket connected to means for controlling the amount of heat from said exhaust to be exchanged with said liquid heating medium. In specific embodiments of this invention the fuel may be gasoline or diesel oil and the liquid heating medium has a boiling point of at least about 560° F. In another embodiment of this invention the first temperature sensing means is set at a temperature of about 425° F. and activates a valve to admit liquid fuel to the vapor generator when that temperature is reached. In another embodiment of this invention the first pressure regulator is set at a pressure of about 20-40 psi and the second pressure regulator is set at a pressure of about 30-60 psi but always having a value of at leat 10 psi greater than the pressure setting of the the first pressure regulator. In other embodiments of this invention the control means for the various features of this invention are operated through solenoid control valves which are powered by the vacuum developed by the engine.

BRIEF DESCRIPTION OF THE DRAWINGS

The novel features believed to be characteristic of this invention are set forth with particularity in the appended claims. The invention, itself, however, both as to its organization and method of operation, together with further objects and advantages thereof, may best be understood by reference to the following description taken in connection with the accompanying drawings in which:

FIG. 1 is a schematic illustration of the vapor generation means and its control for feeding to the carburetor of an internal combustion engine.

FIG. 2 is an enlarged view of a float means for controlling a level of liquid fuel in the vapor generator.

FIG. 3 is a top plan view of the vapor feed control of this invention. FIG. 4 is a cross section view in elevation taken along line 4—4 of FIG. 3.

DETAILED DESCRIPTION OF THE INVENTION

In FIG. 1 the features and working details of this invention may best be understood. An internal combustion engine (now shown on these drawings) is equipped with a carburetor 10, an intake manifold 11, an air filter 12, a fuel storage tank 22, an exhaust 26. It is to these basic components of an internal combustion engine, such as that employed in automobiles, that this invention principally applies. Normally liquid gasoline or diesel oil is fed through intake line 13 to the venturi section of the barrels of the carburetor drawing air from the atmosphere to be mixed with that liquid fuel and fed through intake manifold 11 to the cylinders of the engine to produce power. The liquid fuel is normally introduced into the carburetor through a nozzle which produces a fine mist of droplets of fuel in the stream of air flowing downwardly from air filter 12 through barrel 16 of carburetor 10 into intake manifold 11. In accordance with this invention vaporized fuel, e.g. gasoline or diesel oil, is introduced through line 15 into barrel 16 of carburetor 10 through a suitable vapor intake nozzle 17 which serves to distribute the vapor into the barrels of the carburetor.

The production of vaporized fuel is accomplished by vapor generator 18 which contains a pool of liquid fuel 19 in the bottom of the generator and having a vapor space above that pool 19. Liquid fuel is introduced through line 21 to pool 19, the level of which is controlled by float 20 so as to close the inlet line when the level of pool 19 reaches a predetermined elevation. Around the outside of pool 19 is a jacket containing hot liquid heating medium 23 in an insulated container 24. The heat in liquid medium 23 is absorbed by the liquid fuel in pool 19 causing it to vaporize into the vapor space above pool 19. Liquid heating medium 23 is heated to the desired temperature by heat exchange with the exhaust 26 of the engine. Heat absorber 25 is filled with the liquid heating medium 23 in an insulated container 28 through which a by-pass 27 of exhaust 26 is directed. Heat from exhaust 26 in by-pass 27 is absorbed by the liquid heating medium in container 28 and the hot liquid heating medium is then circulated to container 24 through line 31 and returned through line 29 and propelled by pump 30. In this fashion the heating medium is continually circulated and maintained at an appropriate temperature by heat exchange with the exhaust. Butterfly valve 46 serves to close by-pass 27 when heat from exhaust 26 is not desired.

Vaporized fuel leaves through the top of generator 18 to enter line 32 which leads either to carburetor 10 or to condensor 33 depending upon the pressure of the vapors in line 32. Valve 41 is controlled by solenoid 42, which in turn, is powered by vacuum in line 43 generated in intake manifold 11. Valve 41 is normally closed and can be opened only when engine is running and vacuum is produced. With valve 41 open the direction of flow of vapors in line 32 is controlled by pressure regulators 39 and 40. Pressure regulator 40 is preset to a pressure which will permit the vapors to flow toward carburetor 10 when a first level of pressure is reached, normally 20-40 psi. So long as that pressure is not exceeded the vapors will continue to flow in that direction and be fed into carburetor 10 and burned in the engine to which the carburetor is attached. If for any reason the vapors build up to a higher pressure then that set in pressure regulator, 40, for example 10-20 psi in excess of that set pressure regulator 40, the valve pressure regulator 39 opens and permits the vapors to flow into condensor 33 where they are liquefied and then conducted back to storage tank 22 for use at another time. Pressure regulator 39 is normally set at a valve of about 30-60 psi with condition that the setting be at least 10 psi above the valve set for pressure regulator 40. In order to control the admission of fuel vapors to carburetor 10 in a precise fashion vapor fuel control 44 is included in inlet line 15. This control means will be discussed below in greater detail. This device provides a means controlled by vacuum-operated solenoid 45 to adjust with precision the volume of vaporized fuel which is permitted to flow through line 15 and into carburetor 10.

Fuel from storage tank 22 flows through line 67 and is split to go in either of two directions, one of which leads directly to carburator 10 and the other which leads to vapor generator 18. Valves 34 and 36 are placed in the two sections of that line so as to proportion the amount of liquid fuel which flows in either direction. These valves are respectively operated by solenoids 35 and 37 which are powered by the engines's electrical system. The operation of solenoids 35 and 37 is controlled by temperature sensing means 38 in the vapor space of generator 18. When the temperature sensed by means 38 is below a preset value, valve 34 is closed and valve 36 is open, and when that temperature reaches the preset value, valve 34 opens and valve 36 closes. Thus as the vapors in generator 38 reach a desired temperature they are considered to be the more desirable fuel and are employed as the feed to carburetor 10 while the liquid fuel in line 13 is decreased until no liquid fuel enters through line 13 and the entire fuel inlet is provided through line 15 as hot vaporized fuel.

The temperature of the liquid heating medium in container 24 is sensed by means 50 which is connected to controller 49 and which turn is connected to solenoid 48 operated by vacuum connected to line 43. Solenoid 48 causes control means 47 to move so as to open or close butterfly valve 46 depending upon whether the temperature sensed by means 50 is too high or too low.

Similarily there is a temperature sensing means 51 located in pool 19 to detect the temperature of the liquid fuel at that point. This temperature is directed through control 52 and produces lights or other indicating means connected to lines 53 signaling to the operator of the engine the general temperature level of pool 19. Normally these signals would be such that when pool 19 is below a given temperature one light would be one and when the temperature of pool 19 is above a dangerous limit the other light would be on thus providing the operator with an indication of the condition of the fuel in vapor generator 18. If the temperature reaches a dangerously high level, control 52 automatically signals solenoid 35 to close valve 34, solenoid 37 to open valve 36, and control 47 to close valve 46, thus, providing safety against overheating. Similarly pressure control 68 is attached to line 32 to sense any dangerously high level of pressure, e.g. 20-40 psi above the preset pressure of pressure regulator 39. If that dangerously high level of pressure is sensed by control 68, it provides the same signals as described above to shut valve 34 to open valve 36, and to shut valve 46. These two safety features are desirable but not essential to the operation of the internal combustion engine of this invention.

The various valves, controls, etc. (39,40,41,42,44,45,53,68, etc.) may be attached to a suitable support or housing 14 attached to the top of carburetor 10 similar in size to the present air filter supports mounted on the carburetor.

In FIG. 2 there is an illustration of the one means of providing a float control 20 for the level of liquid fuel in pool 19. In this embodiment there is shown a vertical tubular inlet conduit 21 connected to storage tank 22 through valve 34. Float 20 is made of any convenient material which will be buoyant in the liquid fuel in pool 19 and positioned vertically upward from the upper surface of float 20 is plunger 55 of a size which will permit the flow of liquid between it and the inside wall of conduit 21.

On the top surface of float 20 may be placed a hard valve seat 54, which may for example be made of brass. In order to provide stability for the movement of plunger 55, pin 56 may be placed transversely in conduit 21 and made to cooperate with slot 57 in plunger 55. It is of course to be understood that this is merely one preferred embodiment for the float member of this invention and that other means are equally suitable for sensing the level of pool 19 and transmitting that information to a control for reducing or completely closing the flow of liquid into pool 19. In FIGS. 3 and 4 there may be seen a preferred embodiment for the precise control of the volume of vaporized fuel which may be admitted into line 15 and thus into carburetor 10. In this embodiment vaporized fuel is introduced in conduit 60 into the internal space of the control and vaporized fuel exits through line 15 and is conducted into carburetor 10. Two end plates 58 are used to cap suitable hollow spacers 59 to provide the internal enclosed volume. A perforated divider 61 extends completely across the internal space to divide it into two such spaces. Divider 61 is perforated by a series of apertures 62 which produce passageways connecting the two internal hollow spaces. Slideable control 63 is inserted in a suitable opening in divider 61 to produce a means for closing or opening 62 depending upon the positioning of control 63. Control 63 may be a rod or a sheet depending upon the positioning of apertures 62. The movement of control 63 is accomplished by solenoid 45 (FIG. 1), which in turn is vacuum-actuated. Preferably control 63 is also connected appropriately to the throttle of the engine so that the operator may speed up or slow down the engine. Set screw 64 operates against end 66 of control 63 to provide an idling adjustment for the engine. Thus set screw 64 may be adjusted suitably to have enough vapor pass through apperatures 62 to provide the proper idling speed. It is of course to be understood that other methods of precise control of the vapor feed to the carburetor could be employed and that such other means are considered to be within the scope of this invention.

In the operation of an automobile having the above described invention the automobile would be started employing liquid fuel solely through inlet line 13 to carburetor 10. After the engine has become sufficiently heated to cause the exhaust in line 26 to raise the temperature of liquid heating medium 23 to a level causing the vapor above pool 19 to reach a desired temperature (e.g.) 425° F. for gasoline), valve 34 would open to admit liquid fuel into vapor generator 18. Further vaporization would occur to build up the pressure in the vapor space, and when the appropriate pressure had been reached, pressure regulator 40 would permit the vapors to enter control 44 to line 15 and then into carburetor 10. After the temperature in vapor space of the generator 18 had reached the preset level, the control would close valve 36 and open valve 34. With valve 34 open and valve 36 closed all of the necessary fuel for carburetor 10 is hot vaporized fuel entering through line 15. When an engine is operated in this fashion with all, or substantially all, of the fuel being hot vaporized fuel the mileage is greatly improved, e.g. 45-70 miles per gallon of gasoline in an automobile. Furthermore, the amount of unburned hydrocarbon exhausted to the atmosphere is substantially eliminated and polluting oxides, such as carbon monoxide are also substantially eliminated.

While the invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

What is claimed as new and what is desired to secure by Letters Patent of the United States is:

1. A system for vaporizing fuel and controlling the proportioning of it with liquid fuel as feed to a carburetor in an internal combustion engine comprising:
   (1) a vapor generator having a vapor space above a liquid fuel space;
   (2) a jacket around said liquid fuel space filled with a liquid heating medium;
   (3) means for controlled heating of said liquid heating medium by heat exchange with the exhaust of said internal combustion engine;
   (4) first temperature sensing means in said vapor space connected to means for introducing liquid fuel into said vapor generator when said temperature reaches a preset valve and also connected to means for correspondingly reducing the amount of liquid fuel admitted to the carburetor of said engine;
   (5) first pressure regulator means in the vapor outlet of said vapor generator to direct vaporized fuel to said carburetor upon reaching a preset pressure;
   (6) second pressure regulator means in the vapor outlet of said vapor generator to direct vaporized fuel upon reaching a preset pressure to a condenser for liquefying said vaporized fuel and conducting it to the storage tank of said engine;
   (7) second temperature sensing means in said jacket connected to means for controlling the amount of heat from said exhaust to be exchanged with said liquid heating medium.

2. The system of claim 1 wherein said liquid heating medium has a boiling point of at least about 560° F.

3. The system of claim 1 wherein said fuel is gasoline.

4. The system of claim 1 wherein said first temperature sensing means is set at a temperature of about 425° F. to activate a valve to admit liquid fuel to said vapor generator.

5. The system of claim 1 wherein said first pressure regulator is set at a pressure of 20-40 psi to admit vaporized fuel from said vapor generator to the inlet line to said carburetor.

6. The system of claim 1 wherein said second pressure regulator is set at a pressure of 30-60 psi which is at least 10 psi greater than the pressure setting of said first pressure regulator.

7. The system of claim 1 wherein each of said control means and sensing means comprises a valve operated by a solenoid powered by the vacuum generated in said internal combustion engine.

8. The system of claim 1 wherein the inlet of liquid fuel into said vapor generator is controlled by a float means which closes said inlet when the level of liquid fuel in said generator reaches a predetermined level.

9. The system of claim 1 wherein the volume of vaporized fuel admitted to said carburetor is controlled by an adjustable flow restriction means comprising a plurality of apertures in a vapor barrier and a slideable plug movable in a passageway intersecting said apertures, and solenoid means operated by the vacuum of said engine to move said plug to any position from one extreme which does not restrict the flow of vaporized fuel to the other extreme which prevents such flow.

10. The system of claim 1 wherein said condenser comprises a distillation means for receiving vaporized feed and producing a liquid product.

11. The system of claim 1 which additionally comprises a third temperature sensing means to indicate to the operator of said engine when the temperature of said liquid heating medium in said jacket is below one preset value and above a second preset value.

12. The system of claim 11 wherein said third temperature sensing means upon sensing a preset high temperature actuates controls to cease feeding fuel to said vapor generator, to cease heating said liquid heating medium, and to make liquid fuel freely available to said carburetor.

13. The system of claim 1 which additionally comprises a means for sensing pressure in the vapor space of said vapor generator and upon sensing a preset high pressure actuates controls to cease feeding fuel to said vapor generator, to cease heating said liquid heating medium, and to make liquid fuel fully available to said carburetor.

* * * * *